United States Patent
Tien

[11] 3,806,226
[45] Apr. 23, 1974

[54] LIGHT-GUIDING INTERCONNECTIONS FOR THIN-FILM OPTICAL CIRCUITRY

[75] Inventor: Ping King Tien, Chatham Twp., Morris County, N.J.

[73] Assignee: Bell Telephone Laboratories, Incorporated, Berkeley Heights, N.J.

[22] Filed: Mar. 16, 1973

[21] Appl. No.: 342,063

[52] U.S. Cl. ........ 350/96 WG, 65/DIG. 7, 350/96 R
[51] Int. Cl. .............................................. G02b 5/14
[58] Field of Search ................................ 350/96 WG

[56] References Cited
UNITED STATES PATENTS

| | | | |
|---|---|---|---|
| 3,579,316 | 5/1971 | Dyott et al. | 350/96 WG X |
| 3,610,727 | 10/1971 | Ulrich | 350/96 WG |
| 3,614,198 | 10/1971 | Martin et al. | 350/96 WG |
| 3,753,157 | 8/1973 | Ash et al. | 350/96 WG X |

*Primary Examiner*—John K. Corbin
*Attorney, Agent, or Firm*—W. L. Wisner

[57] ABSTRACT

There is disclosed an arrangement for optically interconnecting thin-film circuit devices. The interconnection is accomplished by gradually tapering to zero thickness the ends of the thin-films between which the interconnection is desired and by overlapping the films so that the tapered region in each film contacts a constant thickness region of the other film. Experimental embodiments of the arrangement are described which demonstrate that light guided in one film propagates efficiently into the next. The interconnections are shown to be relatively simple and inexpensive to fabricate and to be substantially uncritically dependent upon the various film parameters involved. A theory of light wave propagation in the interconnections is also presented.

7 Claims, 5 Drawing Figures

LIGHT-GUIDING INTERCONNECTIONS FOR THIN-FILM OPTICAL CIRCUITRY

BACKGROUND OF THE INVENTION

This invention relates to an arrangement for optically interconnecting thin-film circuit devices.

In the few years since the inception of integrated optics, several varieties of thin-film devices have been investigated which function to guide and manipulate optical wave energy. See, for example, my article in Volume 10 of *Applied Optics*, page 2395 (November 1971), and the article by Stewart E. Miller in Volume QE-8 of the *IEEE Journal of Quantum Electronics*, page 199 (February 1972). Among these devices are a variety of optical waveguiding structures, thin-film input and output coupling arrangements, thin-film lasers, switches, modulators, filters, and associated devices analogous to the rectangular waveguides or co-axial cables and associated devices of the lower frequency systems. These devices have been fabricated by numerous different processes, take a variety of forms, and utilize numerous different optical materials.

At the present stage of development of integrated optics, it is desirable to direct attention to arrangements for assembling these devices into integrated units to form complete and functional optical circuits. In forming such integrated optical circuits, it is most likely that the various thin-film devices would first be fabricated as separate units on a common substrate and then optically interconnected to complete the circuit. The problem of how to simply and economically form interconnections which efficiently transport wave energy from one thin-film device to another has plagued the worker in the art for some time.

Interconnection has typically been accomplished by placing a waveguide, e.g., a glass slide, above and bridging the respective output and input terminals of the thin-film devices to be connected and by coupling the wave energy from the output terminal to the guide and from the guide to the input terminal through evanescent fields. In order to provide efficient transfer of light energy by such a technique, stringent control is required over the thickness, refractive index, position and length of the guide and over the thickness of the coupling gap between the guide and the terminals. To interconnect a large combination of various different thin-film devices into an integrated unit by this technique would constitute a difficult and tedious task.

SUMMARY OF THE INVENTION

I have discovered an arrangement for optically interconnecting thin-film devices which avoids many of these problems.

According to an illustrative embodiment of my invention, first and second optical thin films, which have respective thicknesses of essentially constant value and respective values of refractive index exceeding that of the common substrate upon which they are disposed and which form the light guiding regions of two thin-film devices to be connected, are gradually tapered to zero thickness at the ends between which the interconnection is desired. The respective tapers are typically substantially linear and extend over a distance substantially greater than the optical wavelength to be guided in the films (i.e., greater than about 10 times the wavelength). A third connecting thin film is then deposited in the region of the substrate between the two ends of the first and second films and in overlapping contact with the tapered sections thereof. The connecting film likewise has a refractive index exceeding that of the substrate and likewise has a thickness of essentially constant value except for its end sections which are gradually tapered to zero thickness over constant thickness regions of the first and second films, respectively. As a result of the gradual tapers, optical wave energy guided in the first film propagates freely into the connecting film, and from the connecting film, freely into the second film. Experimental embodiments of this arrangement have demonstrated that the transfer of wave energy from one thin-film device to another is highly efficient and occurs with negligible waveguide mode conversion.

Advantageously, the desired tapers in the various films are typically naturally compatible with conventional film deposition techniques and, consequently, simple to fabricate. Additionally, arrangements embodied according to my invention have been found to be substantially uncritically dependent upon the various parameters involved. For example, the respective materials and thicknesses of the first and second films and the material and length of the third connecting film can be widely varied in the arrangements. The length and slope of the tapers in the ends of each of the films are also selectable from wide ranges of values, provided that each taper extends over a distance of many wavelengths of the guided light. Moreover, the refractive index of the connecting film need exceed only that of the substrate and may be higher than, lower than, or the same as that of the first and second films. These and other features of my invention make the optical interconnection of various combinations of different thin-film devices a relatively simple and inexpensive step in the fabrication of integrated optical circuitry.

BRIEF DESCRIPTION OF THE DRAWING

The various features and advantages of my invention will be better understood from the following detailed description taken with the accompanying drawing in which.

DETAILED DESCRIPTION

The Figure

Figure 1:
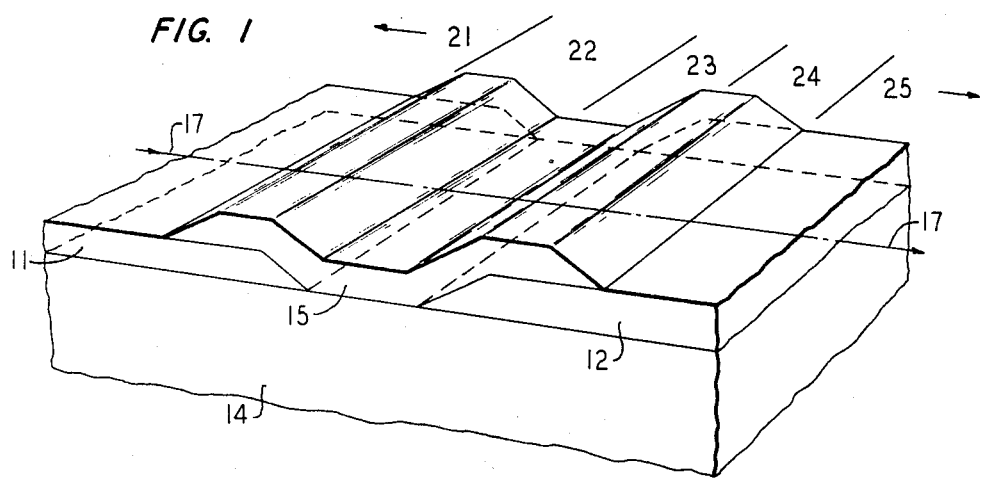
FIG. 1 is a pictorial view of an illustrative embodiment of my invention.

In FIG. 1, optical thin films 11 and 12 may be considered as the output terminal and input terminal, respectively, of two thin-film devices between which the optical interconnection is desired. Films 11 and 12 are typically composed of low loss, optically transparent materials having respective values of refractive index exceeding that of the common substrate 14 upon which they are disposed. For the most part, films 11 and 12 have essentially constant thicknesses generally of the order of the wavelength of the optical radiation to be guided therein. They may, however, include regions in which the film thickness is varied to provide lens or prism effects or optical gratings. Since the two devices to be connected would, in most arrangements, be different types of devices (for example, on the left side of FIG. 1, a thin-film laser, and on the right side, a thin-film modulator), films 11 and 12 may illustratively have respective values of refractive index and thickness that differ from one another. Nevertheless, the respective values of index and thickness could also be the same for each of the films.

Optical interconnection is accomplished according to my invention first, by providing films 11 and 12 in FIG. 1 with end sections that are gradually tapered to zero thickness. These tapers are illustratively linear or near linear and extend over distances in the films substantially greater than the values of the wavelength of the optical radiation to be guided therein (i.e., greater than about 10 times the wavelength). Connecting thin film 15 is then deposited in the region of substrate 14 between films 11 and 12. Film 15, like films 11 and 12, is composed of a low loss, optically transparent material having a refractive index exceeding that of substrate 14. Amorphous materials are preferred for the interconnecting film since they are generally simple to fabricate and have low losses. The value of refractive index of film 15 can be either higher than, lower than, or the same as the respective values of films 11 and 12. Film 15 has an essentially constant thickness of the order of the wavelength to be guided therein, except for both of its end sections which, like those of films 11 and 12, are gradually tapered to zero thickness over constant thickness regions of films 11 and 12.

It can be seen in FIG. 1 that film 15 overlaps the tapered end section of film 11, the tapered end section of film 12, and the substrate spaced between films 11 and 12, and is in direct surface contact with films 11 and 12 and substrate 14. As a result, the structure of FIG. 1 consists of five unique regions which are labeled in the drawing. Film 11 covers region 21 and 22 and tapers near the end of region 22. Film 15 covers regions 22, 23, and 24 and tapers at both ends. Film 12 covers regions 24 and 25 and tapers at the beginning of region 24. The various tapers in the films of FIG. 1 are an important aspect of my invention in that they provide a means for a smooth, gradual transition from one region in FIG. 1 to another, and hence from one film to another. Typically, the films in the drawing would be of the order of 1 micron in thickness. The tapers should then extend over distances at least as great as about 10 microns. Tapers extending over distances of about 50 microns are preferred and are relatively simple to fabricate with conventional film deposition techniques. The thicknesses of the films and the slope of the tapers are greatly exaggerated in FIG. 1 to better illustrate the details of the structure.

My experimental studies have shown that, in structures of the type illustrated in FIG. 1, a beam of optical wave energy guided in film 11, such as beam 17 shown in FIG. 1, will propagate freely from film 11 into film 15 and from film 15 into film 12, provided the transition between the various films is sufficiently gradual, as described above. Moreover, the beam continues to propagate in the same waveguide mode in films 15 and 12 as in film 11. These facts can be verified theoretically by demonstrating that in a gradual transition from one film to another, the net reflection at the interface of the films is zero and, because of the orthogonality of the waveguide modes, the coupling from one mode to another is also zero. It is noted that in regions 22 and 24 of FIG. 1, films 11 and 15 and films 15 and 12, respectively, form two-layer composite thin-film guides. A theoretical analysis of the tapered films and of the composite guides of FIG. 1 is presented in a later section hereinbelow. This analysis will verify the wide variability of the parameters of the present invention.

The arrangement illustrated in FIG. 1 has been shown to have many distinct advantages over prior art arrangements for optically interconnecting thin film devices. For example, the materials and thicknesses of films 11 and 12 and the length of the composite guides in regions 22 and 24 of FIG. 1 are essentially arbitrary in the arrangement. Thus, various types and forms of thin-film devices can be interconnected according to my invention with no specific requirement on the material or other characteristic of the connecting film, other than that it be a suitable light-guiding film. Additionally, the length and slope of the tapers at the ends of each of the films are selectable from wide ranges of values, provided that each taper extends over a distance of many optical wavelengths. As indicated previously, the refractive index of film 15 need exceed only that of substrate 14 and can be higher than, lower than, or the same as the respective values of films 11 and 12. Furthermore, as will become evident from the examples described hereinbelow, connecting film 15 is typically deposited in a manner that causes no damage to the thin-film devices which are connected. Thus, it can be seen that arrangements of my invention do not require critical control of the various film parameters nor precise alignment or positioning of the various films. My invention accordingly allows numerous different thin-film devices to be fabricated, first, as separate units on a substrate, and the interconnections to be made simply by depositing the connecting films as a last step in the fabrication process, much as is done in the fabrication of integrated semiconductor circuitry. As will be recognized by those skilled in the art, in many film fabrication processes, the desired tapers at the ends of the film can be formed with little difficulty during film deposition.

It should be evident from the foregoing description that, if desired, the connecting film 15 can be eliminated from the arrangement and interconnection can be made according to my invention by directly overlapping the output terminal of a first thin-film device (i.e., film 11) with the input terminal of a second thin-film device (i.e., film 12), or vice versa. Such an arrangement can be pictured in FIG. 1 by viewing only regions 21, 22 and 23 thereof and considering film 15 to be the input terminal of the second device. The use of a connecting film in my invention is preferred, however, since such an arrangement allows the various thin-film devices to be fabricated first as separate units on the substrate and the interconnection to be made subsequently to complete the circuit.

EXAMPLES

To demonstrate various features and advantages of my invention, a number of experimental embodiments were investigated, three of which are illustratively described in detail below. In each of these experiments, thin films were deposited on a common lower index substrate in a configuration substantially identical to that shown in FIG. 1. A beam of optical radiation from a He-Ne laser at a wavelength of 0.6328 microns was launched in film 11 by means of the well-known prism-film coupler. See, for example, Volume 14 of *Applied Physics Letters*, page 291 (1969). Light scattered out of the films as the beam propagated along the interior of the films appeared as a bright streak extending along the center line 17 of FIG. 1. This streak, though barely visible to the naked eye, could be photographed upon long exposure. The substrates used in each of the experiments were 2.54 centimeters by 7.6 centimeters glass slides of Corning 744 Pyrex which has a refractive index of 1.4704 at the laser wavelength.

The films in the experimental embodiments were composed of selected polymeric compounds of well-known optical quality. They were deposited on the glass slides by an RF discharge plasma polymerization process, the details of which are set forth in Volume 119 of the *Journal of the Electrochemical Society*, page 451 (1972) and Volume 11 of *Applied Optics*, page 637 (1972). The tapered edges in the films were formed naturally along regions of discontinuity in the height of the substrate surface provided by placing mechanical masks of selected thicknesses (e.g., simple metal plates) at the desired positions on the substrate during film deposition. The lengths of the tapers so produced were roughly linear and extended over distances roughly proportional to the thickness of the mask, up to a few millimeters. Relatively long tapers in the films could be provided using masks, the bottom surface of which were undercut so as to produce a cantilever edge. Tapers extending over distances of about 5 mm could be produced in this way.

A simple two-edged razor blade was found to serve as a suitable mask in fabricating structures of the type shown in FIG. 1. A razor blade was first placed across the center portion of a glass slide with the normals to the sharpened edges of the blade being directed along the center line 17. The openings in the center of the blade were covered with a small, flat brass block. Films 11 and 12 were then deposited and the blade subsequently removed. A razor blade was next positioned at each end of the glass slide so that the previously uncoated portion of the slide and a few millimeters of the just-deposited films 11 and 12 (including the tapered end sections thereof) remained exposed. The openings in the center of the blade were again covered with brass blocks. Connecting film 15 was then deposited. Upon removal of the blades, a structure of the type illustrated in FIG. 1, including the desired tapers, results.

In a first experimental embodiment, films 11 and 12 were fabricated from trimethylsilane (TRMS) and film 15 was fabricated from vinyltrimethylsilane (VTMS), each by the plasma polymerization process described hereinabove. The refractive indices of the TRMS and VTMS films were 1.567 and 1.539, respectively, at the 0.6238 wavelength of the laser. Measurements with the prism film coupler indicated that the films carried two TE waveguide modes, i.e., the $m = 0$ and the $m = 1$ mode. For simplicity, only the TE waveguide modes were investigated. The effective refractive indices for the two modes were 1.5453 and 1.4896, respectively, in films 11 and 12 and 1.5289 and 1.4965, respectively, in film 15. As will be appreciated by those skilled in the art, the effective refractive index of the films is defined as the ratio of a wave velocity in a vacuum to that in the film and is typically expressed as $\beta/k$, where $\beta$ is the phase constant and $k$, the wave vector, has a magnitude equal to the ratio of the angular frequency of the beam in the film to the speed of light in a vacuum, i.e., $\omega/c$. From these values, the thicknesses of the various films can be readily calculated. In this particular embodiment, films 11 and 12 had thicknesses of 1.052 microns and film 15 had a thickness of 1.404 microns. The tapered end sections of the films were measured with a Leitz interference microscope and found to be essentially linear and to extend over distances of approximately 50 microns.

After launching the 0.6328 wavelength beam into film 11, the structure was photographed. In the photograph, a bright streak of substantially equal brightness in regions 21 and 25 was observed, thus indicating that substantially all of the wave energy was transported from film 11 to film 12 by the arrangement. No scattered light was observed in the various film interfaces, thus indicating that the transitions at the regions of the tapers were nearly perfect. The scattered light intensity could be measured along the bright streak using a movable prism coupler. No measurable loss in the beam intensity was detected which could be attributed to transmission from one film to another.

In a second experimental embodiment, a 0.338 micron thick VTMS film was used for films 11 and 12, and a 0.233 micron thick TRMS film was used for film 15. This embodiment, in contrast to the first embodiment, thus utilized a connecting film having a value of refractive index greater than the values for films 11 and 12 and a thickness less than the values for films 11 and 12. The tapered sections of the films were also made to extend over relatively longer distances, i.e., approximately 4 mm. The films in the second embodiment carried only one TE mode of the beam at an effective index of 1.4761 for films 11 and 12 and of 1.4721 for film 15. Photographs of the embodiment again demonstrated that the beam propagated freely from region 21 in FIG. 1 to region 25. Again, no scattering of the guided light was observed at the interfaces of the films.

In a third experimental embodiment, VTMS was again used for films 11 and 12 and TRMS for film 15. Films 11 and 12 were 1.1720 microns thick and carried two TE modes, i.e., $m = 0$ and $m = 1$, at effective indices of 1.5277 and 1.4853, respectively. In this embodiment, film 15 was only 0.4080 microns thick. In theory, a film of this thickness is capable of supporting only the $m = 0$ mode at an effective index of 1.4974. The $m = 1$ mode should accordingly be cut off in film 15.

Photographs of the third embodiment impressively verified the theory. When the $m = 0$ mode was excited in film 11, it propagated, as in other embodiments, freely and efficiently from region 21 to region 25 in FIG. 1. However, when the $m = 1$ mode was excited in film 11, photographs showed that it stopped abruptly at the beginning of region 23 in FIG. 1. The $m = 1$ mode was thus cut off in film 15 and passed into the substrate. It can thus be seen that the arrangement of my invention can be designed so that higher order modes are cut off in connecting film 15 and thus it may serve simultaneously as a mode filter. Optical gratings may also be inscribed in film 15 to serve as a mode filter or polarizer for the beam.

It will be recognized by those skilled in the art that the materials of films 11, 12 and 15 in FIG. 1 may be any of a wide variety of materials other than those specifically mentioned in connection with the examples described hereinabove. Recently, there has been reported in the literature numerous materials which have a demonstrated utility as light-guiding thin-films and numerous processes for depositing these films on suitable substrates. The materials include polycrystalline semiconductors, single crystalline semiconductors, synthetic garnets, a variety of optical glasses and a variety of polymeric compounds. These materials may exhibit various optical properties such as birefringence, optical non-linearity, etc. They may be electro-optic, magneto-optic or be doped with suitable materials so as to be capable of laser action. Well-known processes for forming the films include plasma polymerization, vacuum evaporation and reactive sputtering. In each of these processes, the tapered edges in the films can be produced simply by depositing the films through a mechanical mask in the manner described hereinabove. Other techniques for forming films with the desired tapers and interconnections according to my invention will be realized by those skilled in the art.

THEORY

Although the fabrication of the interconnections of my invention is simple, a theoretical description of their operation is rather complex. It is difficult to discuss light wave propagation in the interconnections without first developing a theory of waveguide modes in the regions where the films overlap and form composite, two-layered waveguides. A simple theory of the modes in the composite guides and a discussion of the wave propagation through structures of the type shown in FIG. 1 will be presented below. In this discussion, the notation used is identical to that used in my earlier published studies of light wave propagation in thin films. To obtain a familiarity with the notation and an understanding of the basic theory, reference should be made to my article in Volume 10 of *Applied Optics*, page 2395 (November 1971), particularly pages 2396 through 2401 thereof.

Figure 2:
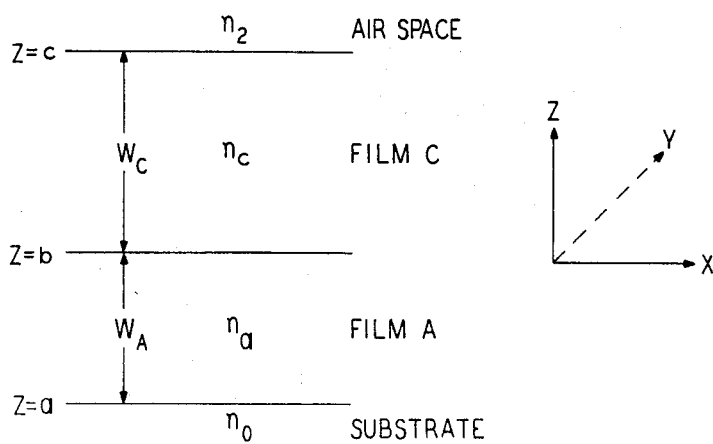
FIG. 2 shows schematically a portion of the two-layered composite thin-film guide shown in region 22 of FIG. 1 useful in explaining the details of the invention.

Consider the illustration of FIG. 2 of the drawing. Shown schematically is a composite thin-film guide which corresponds to a portion of region 22 of FIG. 1 and which is comprised of thin films A and C deposited on a suitable lower index substrate. Let $n_A$, $n_C$, $n_2$, and $n_0$ be the refractive indices of film A, film C, the air space above film A and the substrate, respectively, and $W_A$ and $W_C$ be the thickness of films A and C, respectively. For convenience, it is assumed that $n_A > n_C > n_0 > n_2$. The four media are separated by three interfaces, designated as $z = a$, $b$ and $c$, respectively, in the illustrated coordinate system.

Again, for convenience, only the TE waveguide modes, which have electromagnetic field components $E_y$, $H_x$ and $H_z$, will be discussed. All of the field components vary in time and in x according to the factor exp $(i\beta x - i\omega t)$, where $\omega$ is the angular frequency of the wave in the film, $\beta$ is the phase constant, and x is the direction of wave propagation.

Figure 3A:
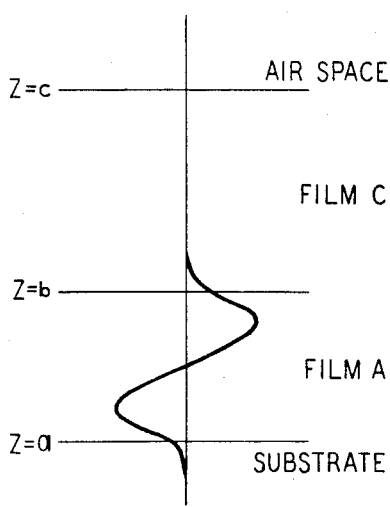
FIGS. 3A and 3B are representations of illustrative forms of the light wave field distribution across the various media of FIG. 2 for two special cases of interest.

Two separate cases will be considered. In the first case, it is assumed that the effective index of refraction experienced by a wave passing through the composite guide shown in FIG. 2 is in the range of $n_C < \beta/k < n_A$. In this case, the wave is totally internally reflected in the interfaces $a$ and $b$ and, accordingly, the wave energy is concentrated only within film A. Typical field representations of the wave for this case are shown in FIG. 3A. It is noted that in film A, the fields are sinusoidal in form, whereas in the other media of FIG. 2, they are exponential.

Figure 3B:
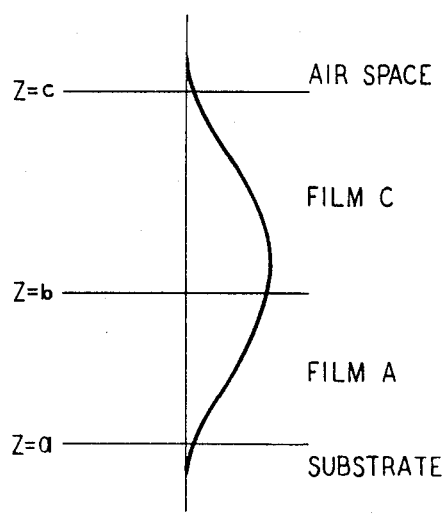

In the second case of interest, it is assumed that the effective index of refraction experienced by a wave passing through the composite guide of FIG. 2 is in the range of $n_0 < \beta/k < n_C$. Here the wave is totally internally reflected at the interfaces $a$ and $c$ of FIG. 2 and accordingly the wave energy fills both films A and C. Typical field representations for this range are illustrated in FIG. 3B where, in films A and C, the fields are sinusoidal in form and, in the substrate and air space, they are exponential.

It is convenient to start with the wave vector relationship which was derived in my earlier paper (i.e., equation (9), page 2399 of the above-cited *Applied Optics* article):

$$k_{zj} = (k^2 n_j^2 - \beta^2)^{1/2}$$

(1)

where $k_{zj}$ is the component of the wave vector in the z direction for a particular medium (i.e., the $j^{th}$ medium) and $n_j$ is the refractive index of that medium. It is also convenient to denote $k_{zj}$ by $b_j$ when it is real and by $ip_j$ when it is imaginary, where $i = \sqrt{-1}$. Equation (1) can now be written for each of the four media in FIG. 2 for each of the two separate cases of interest.

For the first case (i.e., $n_C < \beta/k < n_A$), the desired relationships are as follows:

$$b_A^2 = (kn_A)^2 - \beta^2;$$

(2)

$$p_C^2 = \beta^2 - (kn_C)^2;$$

(3)

$$p_0^2 = \beta^2 - (kn_0)^2;$$

(4)

$$p_2^2 = \beta^2 - (kn_2)^2.$$

(5)

where the subscripts A, C, 0 and 2 denote film A, film C, the substrate, and the air space, respectively. All the quantities in Equations (2) through (5) are real and positive. The field components $E_y$ and $H_x$ are first set up in each of the media of FIG. 2 according to Maxwell equations and equated at the various film interfaces. After considerable algebraic work, it can be shown that the equation for the waveguide modes in the composite guide for the first case are as follows:

$$\tan(b_A W_A - \Phi_{A0} - m_A \pi) = p_C/b_A \, F,$$

(6)

where $$\Phi_{A0} = \tan^{-1}(p_0/b_A); \quad 0 < \Phi_{A0} < \pi/2,$$

(7)

$$F = [1 - \gamma \exp(-2p_C W_C)]/[1 + \gamma \exp(-2p_C W_C)],$$

(8)

$$\gamma = (p_C - p_2)/(p_C + p_2),$$

(9)

and $m_A$ is the largest integer in $(b_A W_A - \Phi_{A0})/\pi$ and $\Phi_{A0}$ is proportional to the phase change experienced by the wave upon reflection from the $z = a$ interface.

It is evident from equations (6) through (9) that, if $W_C$ is large, or if $n_C$ is equal to $n_2$, the term F from equation (8) approaches unity. Equation (6) for the composite guide is then reduced to that of a single film guide formed by film A, a substrate of refractive index $n_0$, and an air space of refractive index $n_C$.

Usually, the order of the mode of a wave is defined as the number of nodes found in the field distribution $E_y$. For example, in the illustration of FIG. 3A, the mode in film A would be $m_A = 1$. It is apparent that for the first case of interest, the order of the mode of the composite waveguide, $m$, is equal to the mode of film A, $m_A$, as defined hereinabove.

To compute numerically the value of the effective $\beta/k$ for the $m^{th}$ mode of a given composite waveguide, one starts with equations (2) through (5), (7) and (8) and determines $W_A$ from equation (6) by assigning a particular value for $\beta/k$. The computation is then repeated with different values of $\beta/k$ until the calculated value of $W_A$ equals the measured thickness of film A. Computer programs have been developed and are available for this type of calculation.

In the second case of interest (i.e., $n_0 < \beta/k < n_C$), equation (3) hereinabove is replaced by the relation:

$$b_C = (k n_C)^2 - \beta^2 \qquad (10)$$

Equations (2), (4) and (5) remain the same. The equation of the modes for the composite guide is now of the form $$b_A \tan(b_A W_A - \Phi_{A0} - m_A \pi) = -b_C \tan(b_C W_C - \Phi_{C2} - m_C \pi), \qquad (11)$$

where $$\Phi_{C2} = \tan^{-1}(p_2/b_C) \quad 0 < \Phi_{C2} < \pi/2. \qquad (12)$$

Here, $\Phi_{C2}$ is proportional to the phase change experienced by the wave upon reflection from the $z = c$ interface. In this case, $m_A$ and $m_C$ are the largest integers in $(b_A W_A - \Phi_{A0})/\pi$ and $(b_C W_C - \Phi_{C2})/\pi$, respectively.

It can be seen from equation (11) that the equality holds if the quantities $(b_A W_A - \Phi_{A0} - m_A \pi)$ and $(b_C W_C - \Phi_{C2} - m_C \pi)$ have opposite signs. An analysis of the field distributions in the composite guide indicates that the mode of the composite guide for the second case, $m'$, for arrangements in which $(b_A W_A - \Phi_{A0} - m_A \pi)$ and $(b_C W_C - \Phi_{C2} - m_C \pi)$ have opposite signs follows the relation $$m' = m_A + m_C. \qquad (13)$$

The equality of equation (11) also holds if $$(b_A W_A - \Phi_{A0} - m_A \pi) > \pi/2 \text{ and}$$
$$0 < (b_C W_C - \Phi_{C2} - m_C \pi) < \pi/2 \qquad (14)$$

or if $$(b_C W_C - \Phi_{C2} - m_C \pi) > \pi/2 \text{ and}$$
$$0 < (b_A W_A - \Phi_{A0} - m_A \pi) < \pi/2. \qquad (15)$$

It can be shown, again by analyzing the field distributions in the composite guide, that the equation of the mode of the composite guide for the second case of interest, $m'$, in arrangements where either equation (14) or equation (15) holds, is of the form $$m' = m_A + m_C + 1. \qquad (16)$$

For FIG. 3B, equation (13) applies and $m_A = m_C = m' = 0$.

The foregoing theory clearly shows that light waves in the $m = 0$ and $m = 1$ modes propagate differently in the composite waveguide regions of structures of the type shown in FIG. 1. It is interesting to follow the progress of a light wave as it traverses, from left to right, the structure of FIG. 1. Consider, by way of example, the first experimental embodiment described in Section 2 hereinabove. There, $n_{11} > n_{15} > n_0$, where $n_{11}$, $n_{15}$ and $n_0$ are the refractive indices of film 11, connecting film 15 and substrate 14. The $m = 0$ mode of the wave will be considered first.

Figure 4:
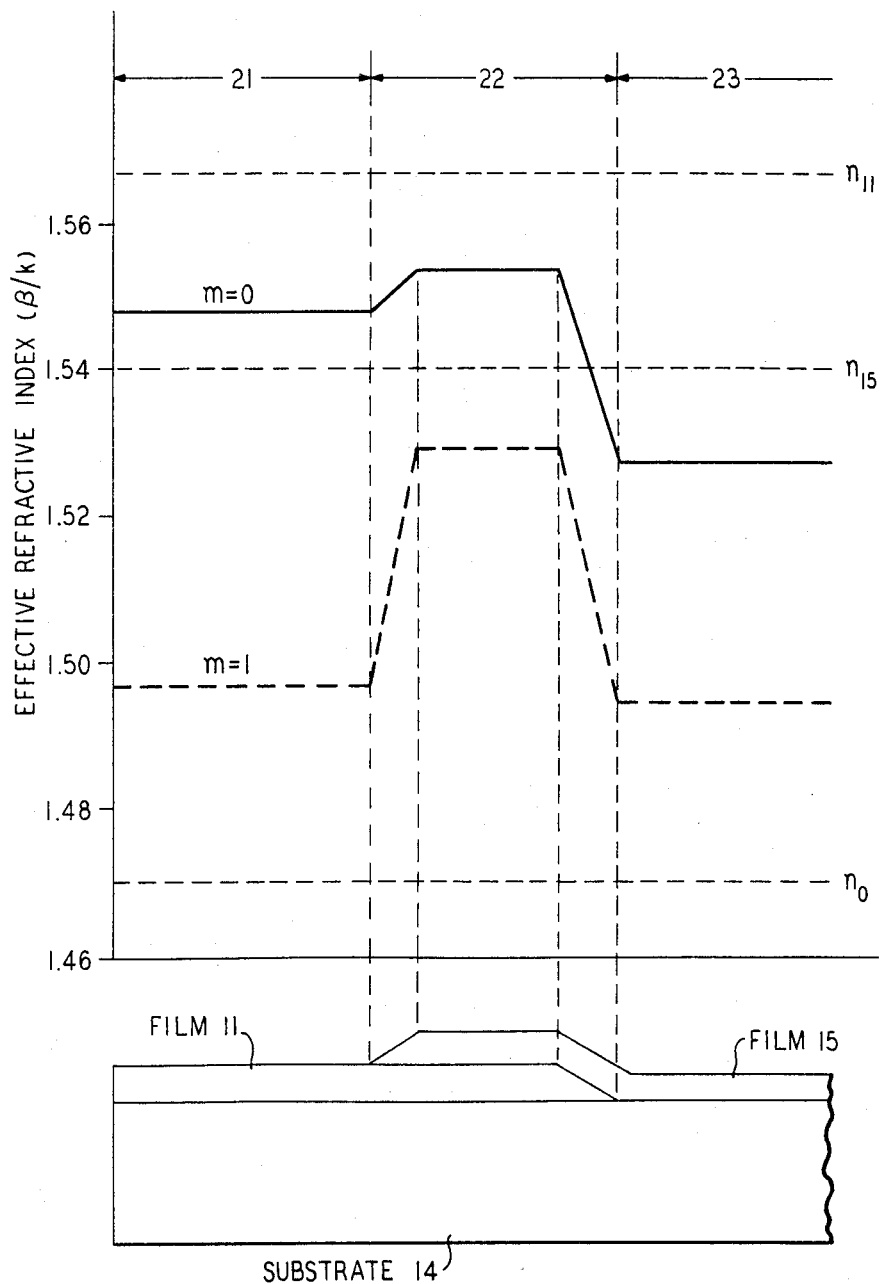
FIG. 4 is a plot of the effective index of refraction versus longitudinal distance along the structure of FIG. 1 for the $m = 0$ and $m = 1$ TE waveguide modes propagating therein.

FIG. 4 of the drawing is a plot of the effective index of refraction $\beta/k$, as a function of the longitudinal distance along regions 21, 22, and 23 of FIG. 1 for the first experimental embodiment. As indicated previously, $\beta/k$ is essentially the reciprocal of the wave velocity in the various regions of FIG. 1. In region 21, film 11 stands along on substrate 14 and the $m = 0$ mode of the wave propagates at $\beta/k = 1.5483$, as computed from the usual equation of modes for a single film waveguide. The wave in region 21 maintains the same $\beta/k$ until it encounters connecting film 15 at the beginning of region 22. The thickness of film 15, $W_{15}$, gradually increases in the tapered section thereof from zero to its full value of 1.404 microns. Using the equations for the composite waveguides developed hereinabove, the calculated $\beta/k$ for the $m = 0$ mode gradually increases in this region to 1.5530. This value of $\beta/k$ is maintained until the beginning of the taper in the thickness of film 11 at the end of region 22.

It is noted that so far in the discussion, $\beta/k$ has been larger than the refractive index of film 15 ($n_{15} = 1.539$). This corresponds to the first case described hereinabove where, in the theory, $n_C < \beta/k < n_A$. Accordingly, the wave energy is concentrated in film 11, leaving only evanescent fields in film 15. Thus, for the $m = 0$ mode in the first experimental embodiment, the wave propagates in film 11 alone during its journey in region 21 and in the beginning of region 22.

At the end of region 22 of FIG. 1, the wave enters the tapered end section of film 11 where the thickness of film 11, $W_{11}$, gradually decreases from 1.052 microns to zero. Again, making use of the equations developed hereinabove for the composite waveguides, it can be shown that the value of $\beta/k$ for the $m = 0$ mode gradually decreases in this region and is equal to $n_{15}$ (1.539) where $W_{11}$ is equal to 0.5017 microns. From that point on, $\beta/k < n_{15}$ and this condition corresponds to the second case of the above-described theory, namely, $n_0 < \beta/k < n_C$. Consequently, the light wave fills both films 11 and 12. This condition remains until $W_{11}$ approaches zero at the end of the taper in film 11 where the wave gradually transfers from film 11 to film 15. At the same time, $\beta/k$ continues to decrease until it reaches a value of 1.5275 at the end of the taper in film 11. From there on into region 23, the wave propagates at this value of $\beta/k$.

The values of $\beta/k$ for the $m = 0$ mode of the light wave are shown by the solid curve in FIG. 4. The remainder of the curve for regions 23 - 25 of the structure can be obtained simply by retracing the solid curve in FIG. 4 from right to left. This is so since the linear optics are always reciprocal and the waveguide structure from region 23 - 25 of FIG. 1 is the mirror image of that from regions 21 — 23 thereof.

The values of $\beta/k$ for the $m = 1$ mode of the light wave are shown by the dashed curve in FIG. 4. The $m = 1$ mode of the wave starts in region 21 of film 11 at a value of $\beta/k = 1.4960$, which is less than $n_{15}$ (1.539). At the onset of region 22, as a result of the taper in film 15, $\beta/k$ for the $m = 1$ mode gradually increases to a value of 1.5290, which is still less than $n_{15}$. This condition corresponds to the second case of the theory presented hereinabove (i.e., $n_0 < \beta/k < W_C$). Consequently, the wave immediately fills both films 11 and 15 at the onset of region 22. At the taper in film 11, $\beta/k$ for the $m = 1$ mode gradually decreases from a value of 1.5290 to a value of 1.4955 and the wave continues to propagate at this latter value in region 23.

Again, the remaining portion of the dashed curve for regions 23 — 25 is simply the mirror image of the curve shown in FIG. 4 since the embodiment being considered is symmetrical about region 23 thereof.

In summary, there are two different ways a light wave can transfer from film 11 to film 15 by means of the overlapping tapered film arrangement shown in FIGS. 1 and 4. A wave starting at the left of FIGS. 1 and 4 can propagate in film 11 alone until, in region 22, the taper in film 11 is encountered where the wave transfers to film 15. Alternatively, a wave can penetrate into film 15 immediately upon encountering, in region 22, the taper in film 15 and then propagate both in films 11 and 15. In the former case, the value of $\beta/k$ in region 22 is larger than $n_{15}$, whereas, in the latter case, it is smaller than $n_{15}$. In both cases, $\beta/k$ increases and hence the wave velocity decreases in the composite two-layered regions of the guide.

I claim:

1. An arrangement for optically interconnecting thin-film devices of the type comprising a transparent substrate, first and second transparent thin films formed on a surface of said substrate, said films having respective thicknesses which are essentially constant for each of the films and respective values of refractive index exceeding that of said substrate so as to be capable of guiding a beam of optical radiation, said arrangement being characterized in that said first film has an end region at which optical interconnection is desired that is gradually tapered to zero thickness along the intended path of said guiding beam, and in that said second film has an end region that is disposed in overlapping contact with the end region of said first film, the end region of said second film being gradually tapered to zero thickness along the intended path of said beam over a constant thickness region of said first film.

2. The arrangement of claim 1 in which the end regions of said films are tapered over a distance sufficient to prevent substantial mode conversion of said beam.

3. The arrangement of claim 2 in which said films have thicknesses of the order of the wavelength of said radiation to be guided therein and in which the tapered regions of said films extend over distances greater than about 10 times the wavelength.

4. An arrangement for optically interconnecting thin-film devices of the type comprising a transparent substrate, a first transparent thin film formed on a surface of said substrate, a second transparent thin film formed on a separate region of said surface of said substrate, said films having respective thicknesses which are essentially constant for each of the films and respective values of refractive index exceeding that of said substrate so as to be capable of guiding a beam of optical radiation, said arrangement being characterized in that said films have end regions between which optical interconnection is desired that are gradually tapered to zero thickness along the intended path of said guided beam, and in that a third transparent thin film is disposed in the region of said surface of said substrate between said first and second films overlapping the respective end regions thereof, said third film having a refractive index exceeding that of said substrate and having end regions that are gradually tapered to zero thickness along the intended path of said beam over constant thickness regions of said first and second films, respectively.

5. The arrangement of claim 4 in which the end regions of said films are tapered over a distance sufficient to prevent substantial mode conversion of said beam.

6. The arrangement of claim 5 in which said films have thicknesses of the order of the wavelength of said radiation to be guided therein and in which the tapered end regions of said films extend over distances greater than about 10 times the wavelength.

7. The arrangement of claim 4 in which said first film has a thickness capable of supporting at least two orders of modes of said beam to be guided therein and in which said third film has a thickness such that it is incapable of supporting at least one of the higher order modes of said beam, whereby the higher order mode is filtered from said films in the tapered region of said first film.

* * * * *